(12) United States Patent
Bath et al.

(10) Patent No.: US 8,006,763 B2
(45) Date of Patent: Aug. 30, 2011

(54) METHOD AND SYSTEM FOR INSTALLING SUBSEA INSULATION

(75) Inventors: William R. Bath, Cypress, TX (US); Marco Sclocchi, Houston, TX (US)

(73) Assignee: Saipem America Inc., Houston, TX (US)

(*) Notice: Subject to any disclaimer, the term of this patent is extended or adjusted under 35 U.S.C. 154(b) by 0 days.

(21) Appl. No.: 12/235,235

(22) Filed: Sep. 22, 2008

(65) Prior Publication Data

US 2009/0050328 A1 Feb. 26, 2009

Related U.S. Application Data

(63) Continuation-in-part of application No. 10/922,418, filed on Aug. 20, 2004, now abandoned.

(51) Int. Cl.
E21B 33/00 (2006.01)
E21B 36/00 (2006.01)

(52) U.S. Cl. ........................ 166/338; 166/302

(58) Field of Classification Search ................. 166/302, 166/338; 138/149
See application file for complete search history.

(56) References Cited

U.S. PATENT DOCUMENTS

| | | | | |
|---|---|---|---|---|
| 1,108,840 A * | 8/1914 | Franke | | 137/375 |
| 3,650,299 A * | 3/1972 | Seiler et al. | | 138/149 |
| 3,935,632 A * | 2/1976 | Maxson | | 29/455.1 |
| 3,996,654 A * | 12/1976 | Johnson | | 29/458 |
| 4,162,093 A * | 7/1979 | Sigmund | | 285/47 |
| 4,259,981 A * | 4/1981 | Busse | | 137/375 |
| 4,527,543 A * | 7/1985 | Denton | | 122/19.2 |
| 4,696,324 A * | 9/1987 | Petronko | | 137/375 |
| 4,807,669 A * | 2/1989 | Prestidge, Sr. | | 138/178 |
| 4,826,215 A * | 5/1989 | Sullivan | | 285/80 |
| 4,925,605 A * | 5/1990 | Petronko | | 264/46.6 |
| 4,941,773 A * | 7/1990 | Vergouw | | 405/157 |
| 4,972,759 A * | 11/1990 | Nelson | | 122/494 |
| 5,732,742 A * | 3/1998 | Mentzer et al. | | 138/97 |
| 6,000,438 A * | 12/1999 | Ohrn | | 138/149 |
| 6,026,861 A * | 2/2000 | Mentzer et al. | | 138/97 |
| 6,179,523 B1 * | 1/2001 | Langner et al. | | 405/169 |
| 6,199,595 B1 * | 3/2001 | Baker | | 138/149 |
| 6,200,068 B1 * | 3/2001 | Bath et al. | | 405/184.1 |
| 6,264,401 B1 * | 7/2001 | Langner et al. | | 405/169 |
| 6,278,096 B1 * | 8/2001 | Bass | | 219/629 |
| 6,371,693 B1 * | 4/2002 | Kopp et al. | | 405/158 |
| 6,415,868 B1 * | 7/2002 | Janoff et al. | | 166/368 |
| 6,520,261 B1 * | 2/2003 | Janoff et al. | | 166/350 |
| 6,881,266 B1 * | 4/2005 | Daykin et al. | | 118/305 |
| 6,889,770 B2 * | 5/2005 | Qvam et al. | | 166/356 |
| 6,939,082 B1 * | 9/2005 | Baugh | | 405/145 |
| 7,036,596 B2 * | 5/2006 | Reid | | 166/302 |

(Continued)

FOREIGN PATENT DOCUMENTS

DE 3216463 A1 * 11/1983

(Continued)

*Primary Examiner* — Thomas Beach
*Assistant Examiner* — James Sayre
(74) *Attorney, Agent, or Firm* — Winston & Strawn LLP

(57) ABSTRACT

Provided herein is a system and method for installing subsea insulation on flowlines, connectors and other subsea equipment by a remotely operated vehicle. This system provides a mold designed and built to suit the parameters of the subsea item to be insulated. The mold is installed around the subsea item to be insulated and then injected with a liquid solution of insulation material. The liquid solution is then allowed to solidify, forming a gel molded insulation.

23 Claims, 6 Drawing Sheets

U.S. PATENT DOCUMENTS

| | | | |
|---|---|---|---|
| 2001/0043991 A1* | 11/2001 | Watkins | 427/358 |
| 2004/0081766 A1* | 4/2004 | Zolghadri | 427/385.5 |
| 2005/0214547 A1* | 9/2005 | Pasquier et al. | 428/447 |
| 2006/0266523 A1* | 11/2006 | Lower | 166/346 |
| 2006/0272727 A1* | 12/2006 | Dinon et al. | 138/149 |

FOREIGN PATENT DOCUMENTS

| | | | |
|---|---|---|---|
| EP | 1628068 | * | 2/2006 |
| GB | 2165910 A | * | 4/1986 |
| WO | WO 03102105 A1 | * | 12/2003 |

* cited by examiner

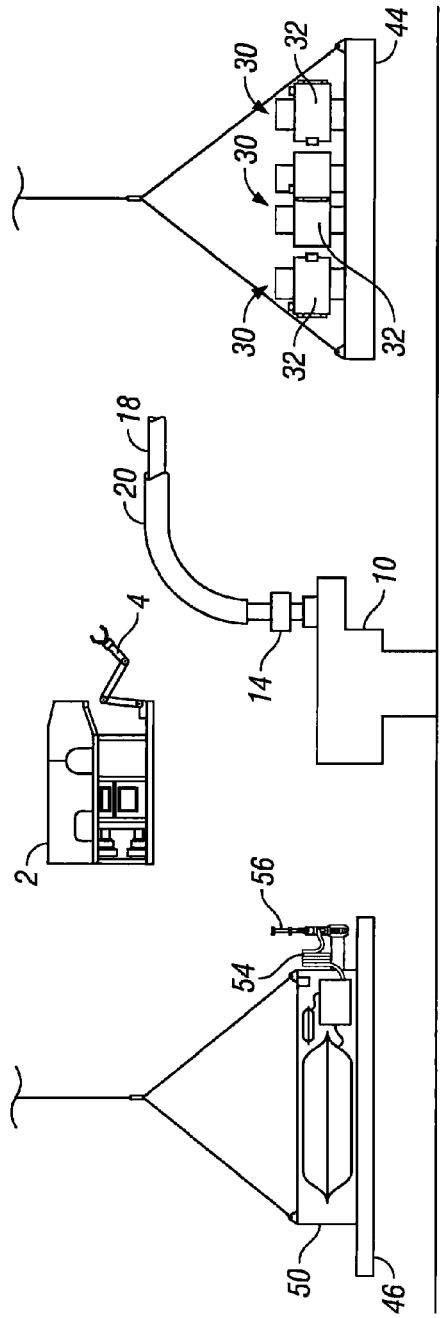
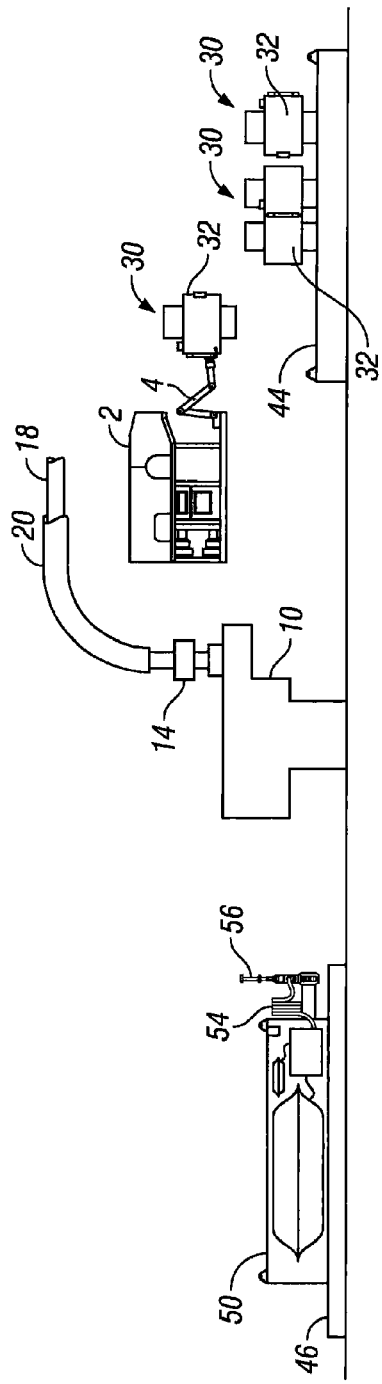
FIG. 2A
FIG. 2B

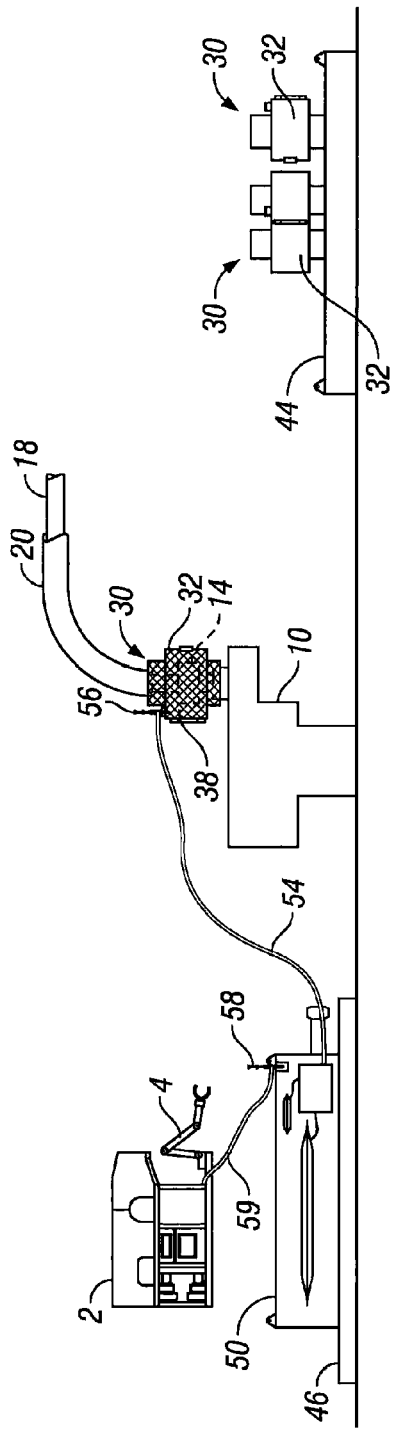
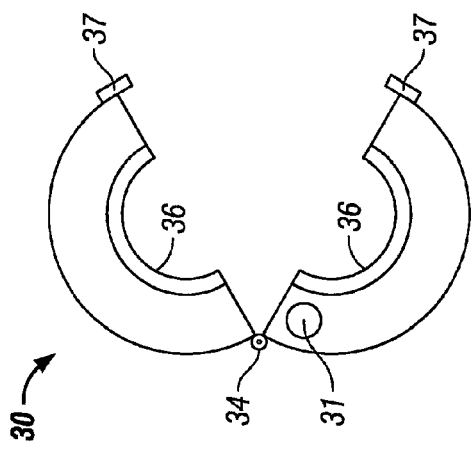
FIG. 2E
FIG. 3

METHOD AND SYSTEM FOR INSTALLING SUBSEA INSULATION

CROSS-REFERENCE TO RELATED APPLICATIONS

The present application is a continuation-in-part of and claims priority from U.S. application Ser. No. 10/922,418, filed Aug. 20, 2004, which is incorporated herein in its entirety by reference.

BACKGROUND OF THE INVENTION

The present invention relates generally to a method and system for installing insulation on subsea oil and gas flowlines, connectors and other equipment.

Subsea oil and gas wells are constantly exposed to cold seawater that can often times be just a few degrees above freezing. Subsea oil production often leaves the well at much higher temperatures, sometimes exceeding 300 degrees Fahrenheit. When the flow of oil is interrupted for any reason, the production fluid in the flowline begins to cool. If the production fluid was allowed to sufficiently cool, oil production could be completely stopped due to the formation of hydrates or paraffin blocks that can form in the flowline and connectors, inhibiting resumption of the flow of the fluid.

It is therefore desirable to insulate the subsea production flowline connectors to maintain the much hotter temperature of the oil and gas production. This is commonly done with rigid covers, commonly referred to as "dog houses" in the industry. These dog houses are placed around the flowline connectors or other equipment to be insulated, and have proven to do a less than adequate job of insulation. However, one key disadvantage of using dog houses is that because they are rigid covers, seawater is able to flow through gaps between the cover and the insulated flowline or equipment. This water flow allows heat to escape, thereby reducing the effectiveness of the insulation.

It would therefore be desirable to develop a system that can install insulation on subsea flowline, connectors or equipment without reducing the effectiveness of the insulation.

SUMMARY OF THE INVENTION

Provided herein is a system and method for installing subsea insulation on flowlines, connectors and other subsea equipment by a remotely operated vehicle. This system provides a mold designed and built to suit the parameters of the subsea item to be insulated. The mold is installed around the subsea item to be insulated and then injected with a liquid solution of insulation material. The liquid solution is then allowed to solidify, forming a gel molded insulation.

BRIEF DESCRIPTION OF THE DRAWINGS

A more complete understanding of the present invention may be obtained with reference to the accompanying drawings:

FIGS. 2A-2E illustrate a remotely operated vehicle (ROV) installing a mold around a subsea connector and pumping insulation into the mold, where a subsea gel injection system is deployed separately from the ROV, in accordance with certain aspects of the present invention.

FIG. 3 illustrates a cross sectional view of a subsea gel insulation mold, in accordance with certain aspects of the present invention.

DESCRIPTION OF ILLUSTRATIVE EMBODIMENTS

Figure 1A:
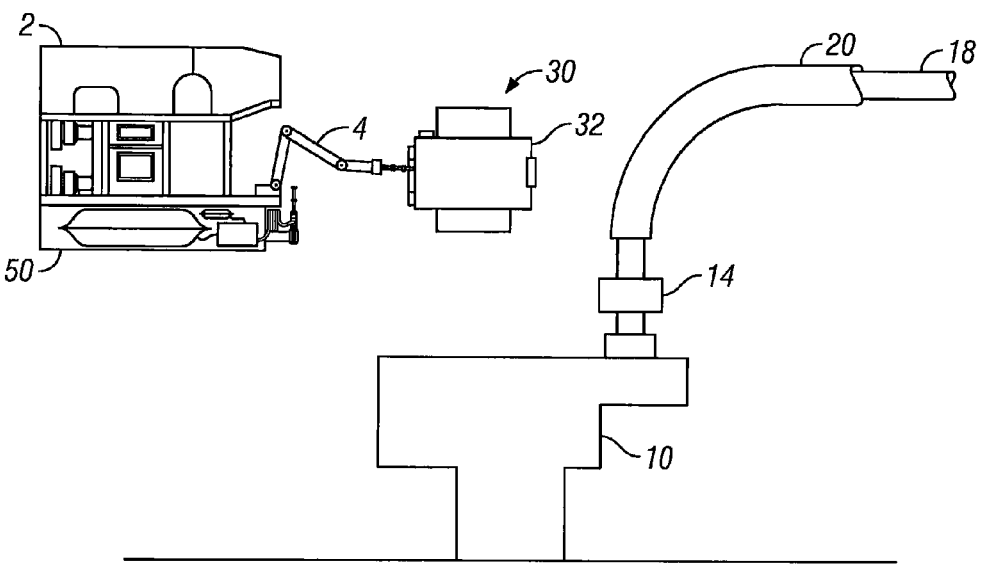
FIGS. 1A-1D illustrate a remotely operated vehicle (ROV) installing a mold around a subsea connector and pumping insulation into the mold, where a subsea gel injection system is integrated within the frame of the ROV, in accordance with certain aspects of the present invention.

FIGS. 1A-1D illustrate one embodiment of the present invention, in which a remotely operated vehicle (ROV) installs insulation around an item to be insulated by the use of a mold. The ROV, such as, for example, the INNOVATOR® manufactured by Saipem America Inc. of Houston, Tex., is launched and lowered to the work site near the item to be insulated. In one embodiment, a subsea gel injection system is a remotely operated package integrated within the frame of the ROV. Referring to FIG. 1A, ROV 2 integrated with subsea gel injection system 50 approaches subsea connector 14 while holding subsea gel insulation mold 30 with ROV manipulator 4.

Subsea connector 14 connects subsea wellhead, manifold or other similar equipment 10 to flowline 18. Flowline 18 is commonly covered with insulation 20 to reduce heat loss from flowline 18. Although subsea connector 14 is insulated in one embodiment of the present invention, any subsea equipment that can be surrounded by a mold can be insulated by certain embodiments of the present invention.

Mold 30 may be a pre-engineered fiberglass, plastic or metal enclosure, the purpose of which is to fit around subsea connector 14 or other subsea equipment to be insulated. Generally, mold 30 will comprise an enclosure with hinges 34 that is closed and secured around the item to be insulated with latches 37 (see FIG. 3). In one illustrative embodiment, mold 30 further comprises gaskets 36 to provide a tight seal between the mold and the item to be insulated. Mold 30 includes receptacle 31 into which the insulation material is injected. The insulation material is injected as a liquid solution that is a combination of an insulation solution and a catalyst solution mixed together during the injection process. The liquid solution is then allowed to solidify, forming a gel molded insulation.

The insulation solution and catalyst is well known in the art. One type of insulation solution that is mixed with a catalyst upon or preceding injection into the mold is DEEPGEL™, offered by Ythan Environmental Services Ltd. However, any type of insulation solution that can be injected into a mold and allowed to cure or harden can be used, and such insulation solutions may not even require the use of a catalyst for hardening the insulation. Thus, in some instances, insulation (whether cured or not cured) may refer to the insulation solution or the combination insulation solution and catalyst mixture. One of ordinary skill in the art will appreciate that the volume of insulation solution and catalyst pumped into the mold will vary based upon the amount of insulation desired for the particular item to be insulated, the enclosed volume of the mold, type of insulation solution and catalyst utilized, and subsea conditions (such as temperature, pressure, and time required to fill the mold) surrounding the item to be insulated.

In a preferred embodiment, mold 30 is installed subsea by a ROV, but in other embodiments the mold is preinstalled on the item to be insulated before being lowered subsea. In one embodiment, manipulator 4 connects a hydraulic hot stab to mold installation tool 32 that is used in conjunction with mold 30. The hydraulic hot stab powers mold installation tool 32 to pick up and/or grab mold 30 by the use of hydraulic clamps, lock and/or enclose mold 30 around subsea connector 14, set, close and/or lock latches 37 on mold 30, and release and/or disconnect mold installation tool 32 from mold 30. In an alternative embodiment, mold installation tool 32 may not be necessary and manipulator 4 directly grabs mold 30 and encloses mold 30 around the item to be insulated. In one embodiment, multiple molds are attached to the ROV itself, but if numerous molds are needed, a separate mold deployment skid can be provided to supply the additional molds.

Figure 1B:
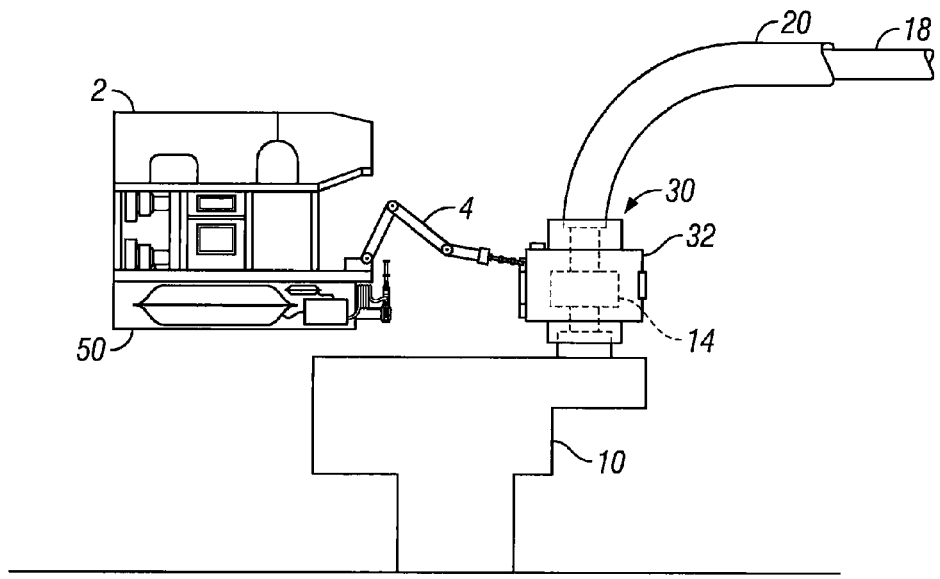

Referring to FIG. 1B, ROV 2 installs subsea gel insulation mold 30 on subsea connector 14 by the use of manipulator 4. In one embodiment, manipulator 4 surrounds subsea connector 14 with mold 30 and uses mold installation tool 32 to lock mold 30 around subsea connector 14. Mold installation tool 32 remains on mold 30 while the insulation solution/catalyst mixture is injected into the mold from subsea gel injection system 50, or alternatively, manipulator 4 then releases mold installation tool 32 from mold 30 while mold 30 remains around subsea connector 14.

Figure 1C:
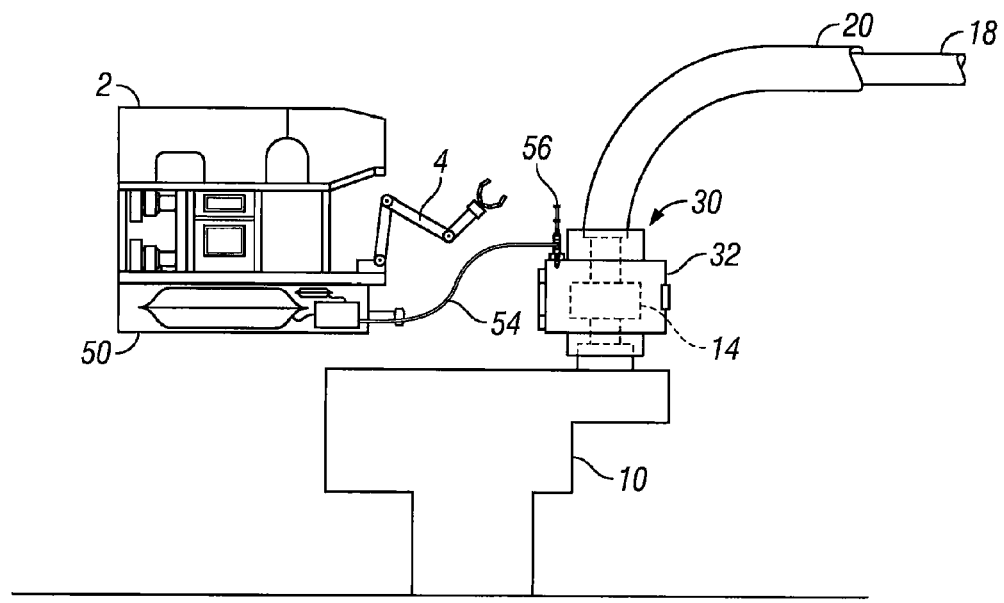

Referring to FIG. 1C, manipulator 4 grabs hot stab 56 and connects hot stab 56 to mold 30 by placing hot stab 56 into a receptacle on mold 30. Hot stab 56 is connected to injection hose 54, which is connected to subsea gel injection system 50.

Figure 1D:
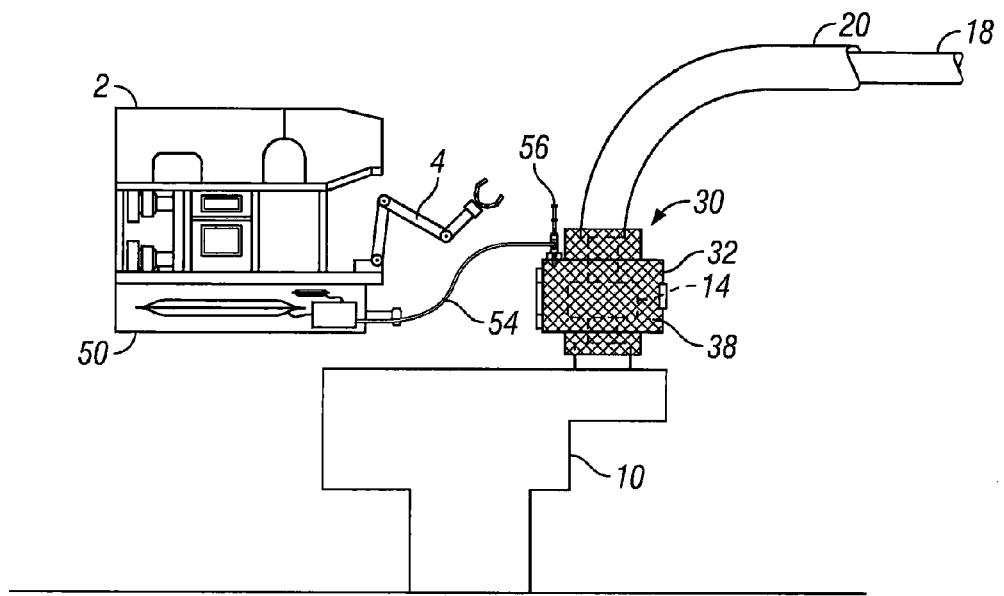

Referring to FIG. 1D, subsea gel injection system 50 pumps a desired volume of an insulation solution and catalyst mixture into subsea gel insulation mold 30, forming insulation 38 between subsea connector 14 and mold 30. After mold 30 is filled with the desired amount of the insulation/catalyst mixture, subsea gel injection system 50 stops pumping and ROV 2 disconnects hot stab 56 from mold 30. The flow of catalyst is then stopped, and a small quantity of insulation solution is pumped through injection hose 54 and hot stab 56 to clean out the mixed solution, preventing the insulation/catalyst mixture from curing and hardening within hot stab 56 and other components. ROV 2 is now ready to install the next mold, or if all molds are installed, the ROV is recovered to the surface.

Figure 2C:
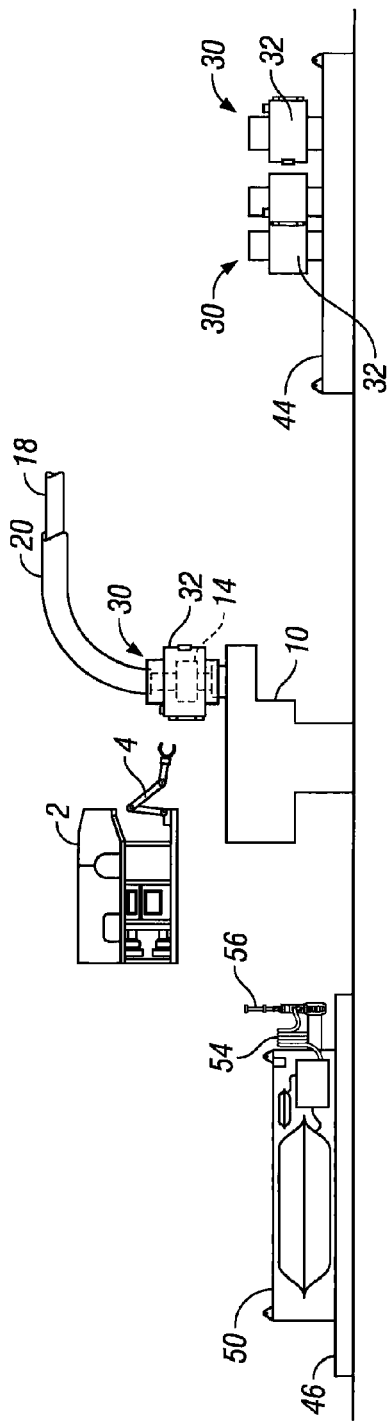

Another illustrative embodiment of the present invention is illustrated in FIGS. 2A-2E, which employs separate skids and may be useful when there are a number of molds to be filled with insulation. Referring to FIG. 2A, subsea insulation solution reservoir skid 46 and subsea mold deployment skid 44 are lowered by wire from the water surface to an area in the vicinity of the work site. ROV 2 may or may not be lowered or positioned at the same time that insulation solution reservoir skid 46 and subsea mold deployment skid 44 are lowered. Rather than being integrated within the frame of ROV 2, subsea gel injection system 50, injection hose 54, and hot stab 56 are attached to subsea insulation solution reservoir skid 46.

Referring to FIG. 2B, ROV 2 flies to mold deployment skid 44 and uses manipulator 4 to grab mold installation tool 32. Manipulator 4 then uses mold installation tool 32 to pick up mold 30. Referring to FIG. 2C, ROV 2 then flies mold 30 over to subsea connector 14, where manipulator 4 uses mold installation tool 32 to lock mold 30 around subsea connector 14. Manipulator 4 then removes mold installation tool 32 and returns it to mold deployment skid 44, or in an alternative embodiment, mold installation tool 32 remains on mold 30 while the insulation solution/catalyst mixture is injected into the mold from subsea gel injection system 50.

Figure 2D:
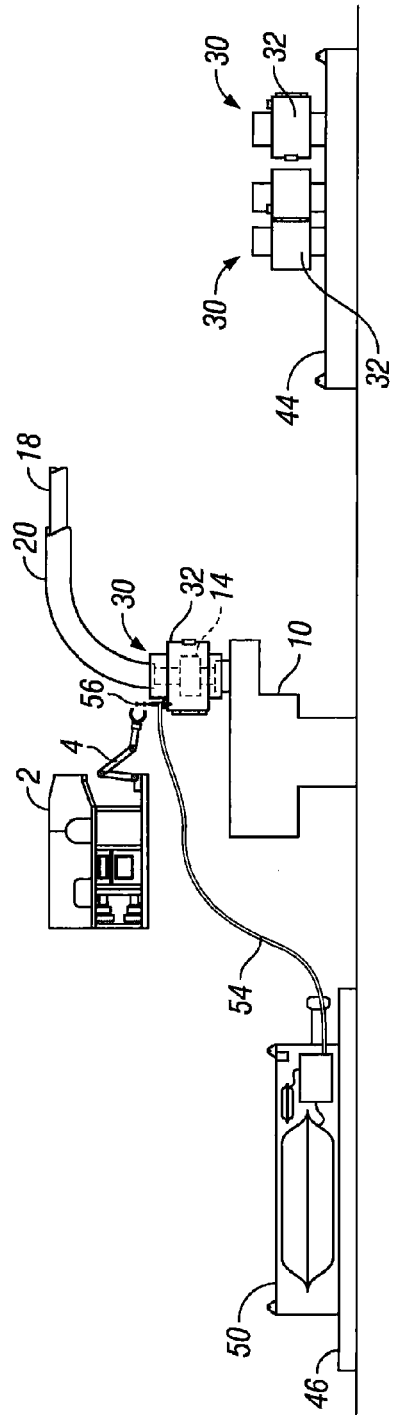

Referring to FIG. 2D, ROV 2 then flies over to insulation solution reservoir skid 46 and uses manipulator 4 to grab hot stab 56, after which ROV 2 flies over to mold 30 and places hot stab 56 into a receptacle on mold 30 for the injection of an insulation solution and catalyst mixture into the mold. Hot stab 56 is connected to injection hose 54, which is connected to subsea gel injection system 50.

Referring to FIG. 2E, ROV 2 flies to insulation solution reservoir skid 46 and uses manipulator 4 to connect power hot stab 58 to insulation solution reservoir skid 46 to power subsea gel injection system 50 from the power system of ROV 2, which is connected to power hot stab 58 by power line 59. Subsea gel injection system 50 pumps a desired volume of an insulation solution and catalyst mixture into subsea gel insulation mold 30, forming insulation 38 between subsea connector 14 and mold 30. After mold 30 is filled with the desired amount of the insulation/catalyst mixture ROV 2 disconnects hot stab 56 from mold 30. The subsea gel injection system 50 stops pumping the catalyst, and a small quantity of insulation solution is pumped through hot stab 56 to clean out the mixed solution, preventing the insulation/catalyst mixture from curing and hardening within hot stab 56 and other components. ROV 2 is now ready to install the next mold, or if all molds are installed, the ROV, mold deployment skid, and insulation solution reservoir skid are recovered to the surface.

Figure 4:
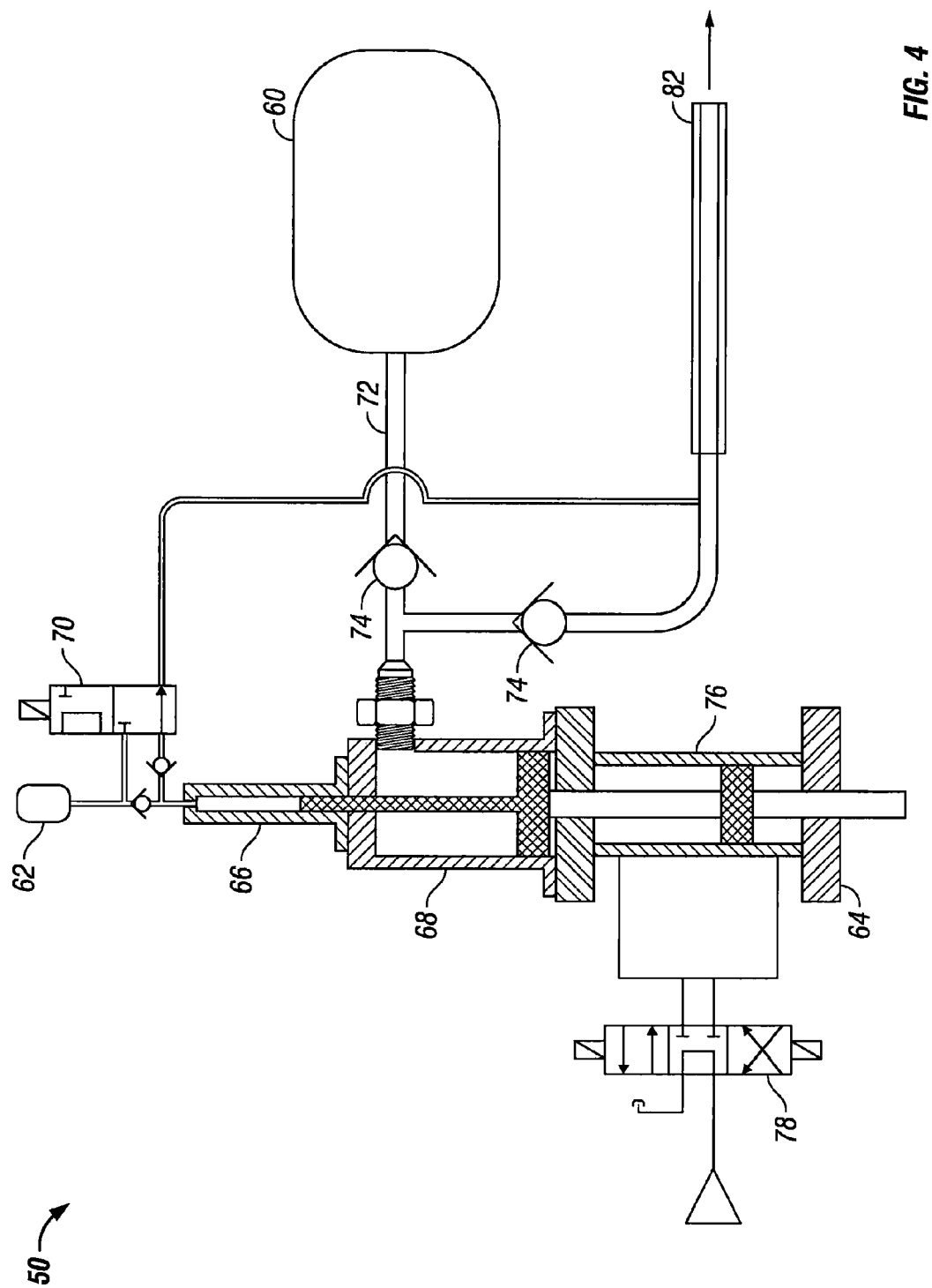
FIG. 4 illustrates a diagram of a subsea gel injection system, in accordance with certain aspects of the present invention.

FIG. 4 illustrates an illustrative embodiment of subsea gel injection system 50. As described herein, a subsea gel injection system in some situations may be attached to the ROV's frame, and in other situations may be lowered to the surface floor by line wire separately from the ROV. In both instances, the functionality of the subsea gel injection system remains substantially the same. When the subsea gel injection system is attached to the ROV, the injection hose and hot stab are preferably placed near the ROV's manipulator. If deployed separated from the ROV, the subsea gel injection system is not limited to the ROV's dimensions and thus it may be much larger than the ROV, which allows for greater pumping capabilities and larger catalyst and insulation solution reservoirs. Whether connected to the ROV or deployed separately, a pump module of the subsea gel injection system is connected to the ROV so as to draw power from the ROV system. For instance, if the pump module requires hydraulic power, then it is connected to the hydraulic system of the ROV, however, if the pump module is electric, then it would be connected to the electrical system of the ROV.

Referring to FIG. 4, subsea gel injection system 50 comprises pump module 64, mixing tube 82, insulation solution reservoir 60, and catalyst reservoir 62. Pump module 64 is used to pump the insulation/catalyst mixture through mixing tube 82, injection hose 54, and hot stab 56 and into mold 30. Mixing tube 82 is well known in the art and is preferably a tube with alternating spiraled vanes that mixes catalyst and insulation solution fluids as the insulation/catalyst mixture passes through mixing tube 82 and into injection hose 54. Injection hose 54 delivers the insulation/catalyst mixture from mixing tube 82 to hot stab 56 for the injection of the insulation/catalyst mixture into mold 30.

In one embodiment pump module 64 comprises catalyst cylinder pump 66, insulation cylinder pump 68, catalyst stop valve 70, suction hose 72, insulation check valves 74, hydraulic drive cylinder 76, and directional control valve 78. In operation, hydraulic pressure is inputted to the pump module and the direction of piston movement is selected by control valve 78. One of ordinary skill will recognize that pump module 64 is a typical reciprocating piston pump with integrated insulation and catalyst pumps that measure and dispense the insulation and catalyst. The catalyst cylinder pump 66, insulation cylinder pump 68, and hydraulic drive cylinder 76 are fixed to a common shaft so that the correct proportion of catalyst to insulation is always maintained. The pump may be manually or automatically reciprocated by control valve 78. One of ordinary skill will appreciate that any pumping arrangement or design may be compatible with this invention as long as it is able to pump the desired ratio and amount of insulation solution and catalyst into the mold.

Insulation solution reservoir 60 stores the fluid insulation solution, and in one embodiment, the insulation solution is pumped into the flexible bladder of insulation solution reservoir 60 on the surface. Similarly, catalyst reservoir 62 stores the fluid catalyst, and in one embodiment, the catalyst is pumped into the flexible bladder of catalyst reservoir 62 on the surface.

While the methods and systems of the present invention have been described in terms of preferred illustrative embodiments, it will be apparent to those of skill in the art that variations may be applied to what has been described herein without departing from the concept and scope of the invention. All such similar substitutes and modifications apparent to those skilled in the art are deemed to be within the scope and concept of the invention as it is set out in the following claims.

What is claimed is:

1. A system for installing subsea insulation comprising: a remotely operated vehicle;
    a subsea gel insulation mold installed subsea on an item to be insulated by the remotely operated vehicle; and
    a subsea gel injection system capable of pumping insulation solution and catalyst through a mixing nozzle into the installed subsea gel insulation mold forming insulation on the item to be insulated between the item to be insulated and the mold; wherein insulation solution and catalyst are stored in separate reservoirs.

2. The system of claim 1, wherein the subsea gel injection system is integrated within the frame of the remotely operated vehicle.

3. The system of claim 1, further comprising a subsea insulation solution reservoir skid.

4. The system of claim 3, wherein the subsea gel injection system is attached to the subsea insulation solution reservoir skid.

5. The system of claim 1, further comprising a subsea mold deployment skid.

6. The system of claim 1, wherein the subsea gel insulation mold is selected from the group consisting of a pre-engineered fiberglass enclosure, a plastic enclosure, and a metal enclosure.

7. The system of claim 1, further comprising a mold installation tool.

8. The system of claim 1, wherein the subsea gel insulation mold is a hinged enclosure.

9. The system of claim 1, wherein the subsea gel insulation mold comprises a receptacle for the injection of insulation.

10. A method for installing subsea insulation comprising: using a remotely operated vehicle to install subsea a subsea gel insulation mold on an item to be insulated; and
    pumping insulation solution and catalyst through a mixing nozzle into the installed subsea gel insulation mold forming insulation on the item to be insulated between the item to be insulated and the mold.

11. The method of claim 10, wherein the insulation solution is pumped into the subsea gel insulation mold by the remotely operated vehicle.

12. The method of claim 10, wherein the insulation solution is pumped into the subsea gel insulation mold by a subsea gel injection system.

13. The system of claim 12, wherein the subsea gel injection system is attached to a subsea insulation solution reservoir skid.

14. The system of claim 12, wherein the subsea gel injection system is integrated within the frame of the remotely operated vehicle.

15. The method of claim 14, wherein the insulation solution and catalyst are pumped into the subsea gel insulation mold by a subsea gel injection system.

16. The method of claim 10, wherein the remotely operated vehicle uses a mold installation tool to install the subsea gel insulation mold.

17. The method of claim 10, wherein the subsea gel insulation mold is selected from the group consisting of a pre-engineered fiberglass enclosure, a plastic enclosure, and a metal enclosure.

18. The method of claim 10, wherein the subsea gel insulation mold is a hinged enclosure.

19. The method of claim 10, wherein the subsea gel insulation mold comprises a receptacle for the injection of insulation solution.

20. A method for installing subsea insulation on subsea equipment comprising:
    a) providing subsea a plurality of subsea gel insulation molds;
    b) using a remotely operated vehicle subsea to grab one of the plurality of subsea gel insulation molds;
    c) using the remotely operated vehicle subsea to install one of the plurality of subsea gel insulation molds on an item to be insulated;
    d) pumping insulation solution and catalyst through a mixing nozzle subsea into one of the plurality of subsea gel insulation molds by a subsea gel injection system forming insulation on the item to be insulated between the item to be insulated and the mold; and
    e) repeating steps b-d until the plurality of subsea gel insulation molds are insulated.

21. The method of claim 20 wherein the plurality of subsea gel insulation molds are provided by a mold deployment skid.

22. The method of claim 20, wherein the subsea gel injection system is attached to a subsea insulation solution reservoir skid.

23. The system of claim 20, wherein the subsea gel injection system is attached to the subsea insulation solution reservoir skid.

* * * * *